United States Patent [19]

Noland et al.

[11] Patent Number: 4,570,576
[45] Date of Patent: Feb. 18, 1986

[54] ANIMAL WATERING CUP APPARATUS

[76] Inventors: Wayne B. Noland, 5645 SE. Maple; Larry F. Noland, 5645 SE Maple, both of Carlisle, Iowa 50047

[21] Appl. No.: 587,122

[22] Filed: Mar. 7, 1984

[51] Int. Cl.⁴ ............................................. A01K 7/00
[52] U.S. Cl. .................................................... 119/73
[58] Field of Search ....................... 119/71, 73, 78, 79

[56] References Cited

U.S. PATENT DOCUMENTS

| | | | |
|---|---|---|---|
| 1042246 | 10/1912 | Markley | 239/29 |
| 1,341,070 | 5/1920 | Pruden | 119/73 |
| 2,252,623 | 8/1941 | Gerken | 119/73 |
| 2,616,593 | 11/1952 | Leibenhaut | 239/24 |
| 3,745,977 | 7/1973 | Martin | 119/73 |
| 3,949,707 | 4/1976 | Armstrong et al. | 119/73 |
| 4,078,524 | 3/1978 | Peterson et al. | 119/71 |
| 4,100,885 | 7/1978 | Kapplinger | 119/73 |
| 4,130,090 | 12/1978 | Bohlmann | 119/73 |
| 4,185,589 | 1/1980 | Peterson et al. | 119/73 |
| 4,248,177 | 2/1981 | Peterson et al. | 119/73 |
| 4,320,720 | 3/1982 | Streed | 119/73 |
| 4,395,974 | 8/1983 | Schafer et al. | 119/73 |

Primary Examiner—Robert P. Swiatek
Attorney, Agent, or Firm—Henderson & Sturm

[57] ABSTRACT

An apparatus for watering animals having an enclosed housing with a reservoir of water disposed therein. A cup-shaped member is disposed on an upward part of such housing for receiving the mouth of an animal to be watered, and an opening is disposed in the cup-shaped member which has a draw tube attached thereto. The draw tube extends from such opening down into the water in the reservoir for permitting an animal having its mouth in such cup-shaped member to suck water from the reservoir, through the draw tube and through the opening and into its mouth, whereby the water in the reservoir will constantly be made available for drinking, but will be isolated from outside ambient temperatures and dirt.

14 Claims, 6 Drawing Figures

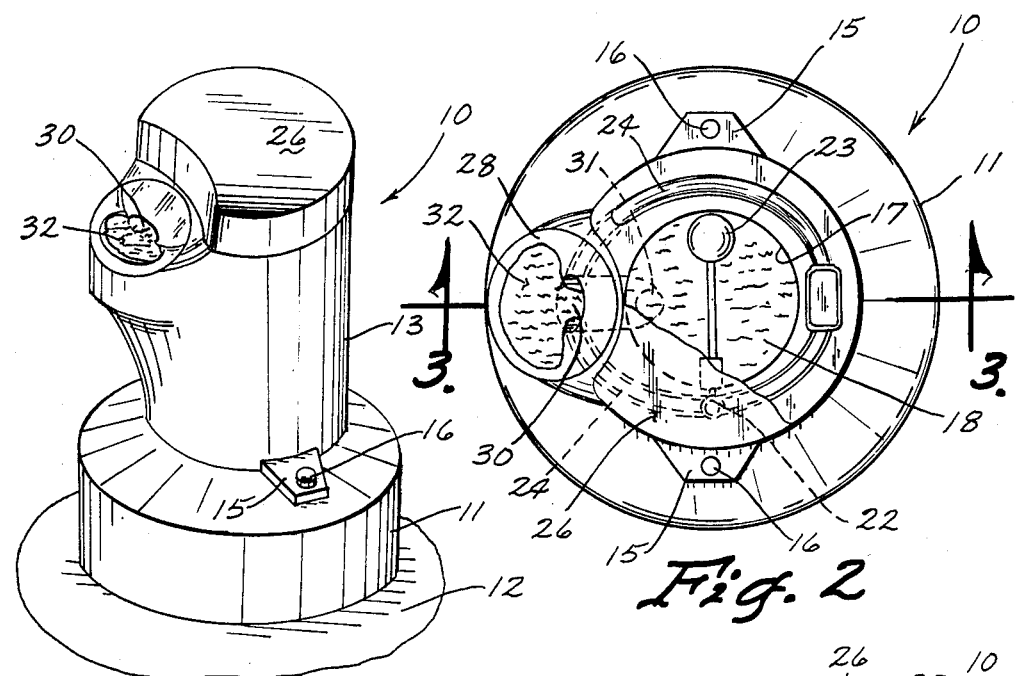
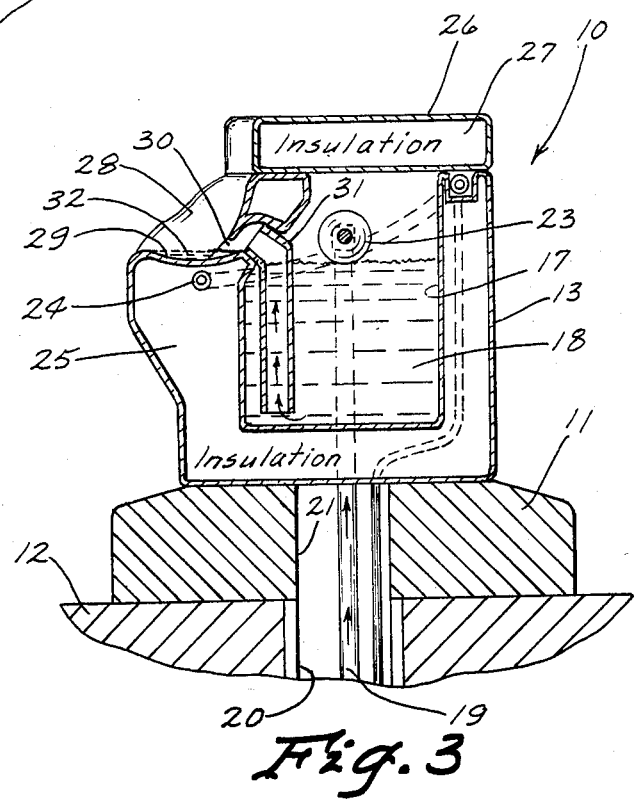

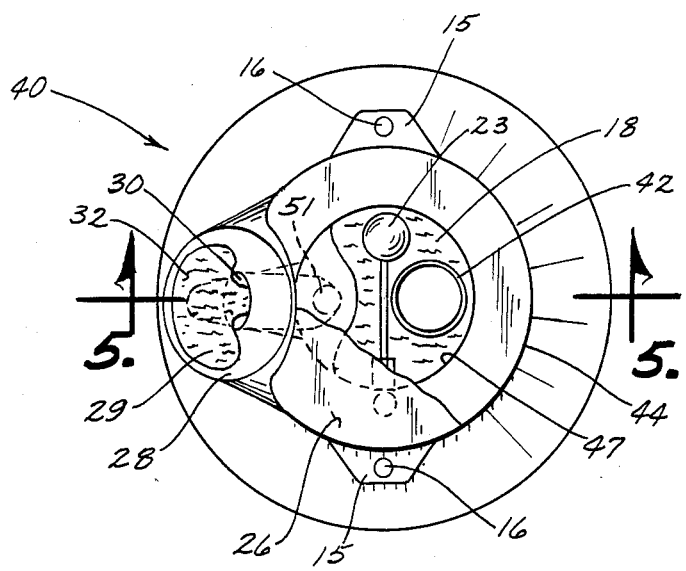
Fig. 4
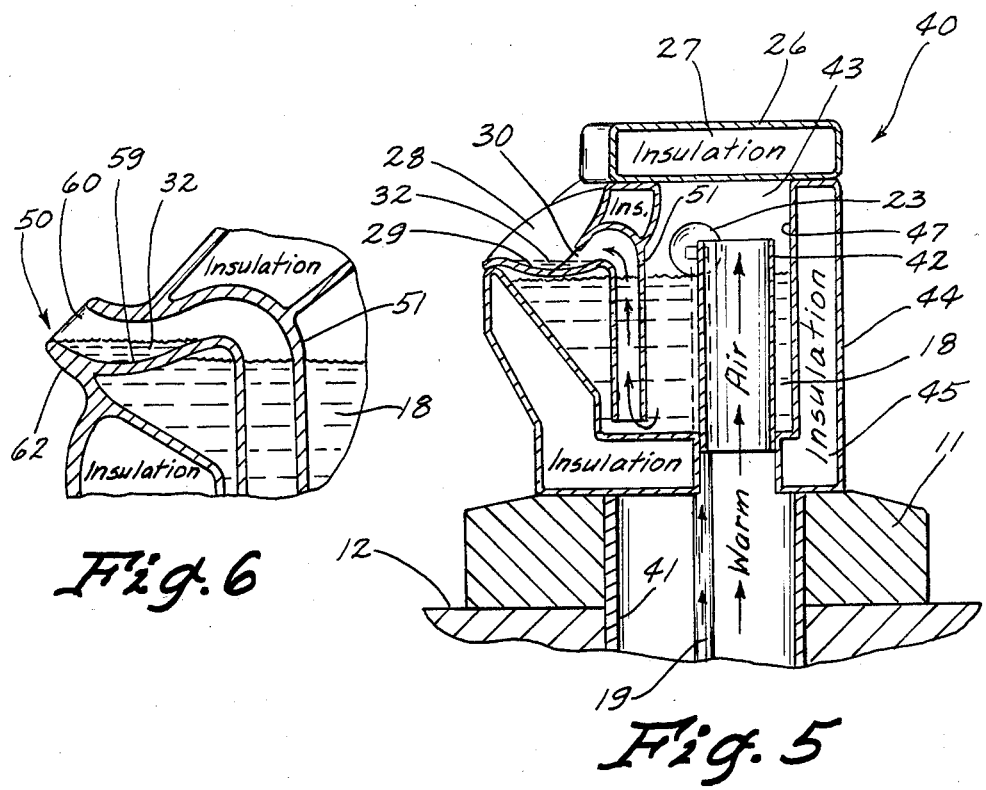
Fig. 6
Fig. 5

ANIMAL WATERING CUP APPARATUS

TECHNICAL FIELD

The present invention relates generally to an apparatus for watering animals, and more particularly to such an apparatus which isolates a supply of such water from ambient air and from outside contaminants.

BACKGROUND ART

Many devices have been devised for the purpose of watering livestock and other animals. The main problem for automatic watering devices is to prevent such device from freezing up in the wintertime and to dependably provide fresh water to livestock. Some of these inventions merely have a reservoir of water on the top of a housing subject to ambient temperatures and then provide a heater in or adjacent to such pool of water to keep the water from freezing. Typically, float valves are provided for adding more water to this reservoir once the animal has drunk water from such reservoir. One of the problems with this kind of a watering apparatus is that it requires a substantial amount of heat energy to keep the water from freezing and is therefore quite expensive to operate. Another problem with this type of an approach is that the float valve often freezes and also requires considerable maintenance to keep it operating properly.

Another approach to the problem has been the use of nipple waterers. These waterers have a sealed and enclosed housing with valve members extending outwardly therefrom and having metal valve operators thereon such that when an animal places its mouth around and over the nipple valve, the valve will be open to run water into the animal's mouth; and, when the animal removes its mouth from around the nipple valve, the valve will automatically close. There are also considerable problems with this type of watering device. First of all, it seems to be more practical for hogs than for other types of animals such as cattle and horses mainly because the cattle and horses do not naturally learn to drink from this type of a device and because they must be positioned higher for larger animals. Another problem associated with nipple valves is that because they are on the outside of the sealed housing, they tend to freeze unless a large amount of heat is generated within the inside of the housing and transmitted from there to the metal portion of such nipple valve. This, again, is an energy wasting arrangement.

Still another approach to this problem is to have a sealed housing with a reservoir of water therein which has a cover of some sort thereon for sealing the compartment of water from ambient air. For example, U.S. Pat. No. 3,745,977 to Martin uses a float valve which can be opened by an animal in order to obtain access to the reservoir of water below it and which automatically closes when an animal is not exerting pressure upon it. Other patents such as U.S. Pat. Nos. 4,100,885 to Kapplinger and 4,395,974 to Schafer, et al., have reservoirs of water with pivoting covers thereon which require that the animal learn to lift the pivoting cover upwardly in order to gain access to the reservoir therebelow. One of the major problems with this type of a device is that not all animals will learn how to open the top of the device in order to drink from the reservoir therein.

Consequently, there is a need for an animal watering apparatus which is dependable, energy efficient, and which all animals will inherently know how to drink therefrom.

DISCLOSURE OF THE INVENTION

The present invention relates to an apparatus for watering animals having an enclosed housing with a reservoir of water disposed therein. A cup-shaped member is disposed on an upward part of such housing for receiving the mouth of an animal to be watered, and an opening is disposed in the cup-shaped member which has a draw tube attached thereto. The draw tube extends from such opening down into the water in the reservoir for permitting an animal having its mouth in such cup-shaped member to suck water from the reservoir, through the draw tube and through the opening and into its mouth, whereby the water in the reservoir will constantly be made available for drinking, but will be isolated from outside ambient temperatures and dirt.

An object of the present invention is to provide an improved animal watering apparatus.

Another object of the invention is to provide an animal watering apparatus which is energy efficient.

A further object of the invention is to provide an animal watering apparatus which is extremely dependable.

Still another object of the present invention is to utilize the natural instincts of an animal to suck on the source of water while it is drinking to cause the animal to suck water from a reservoir which is isolated form the point at which the animal is drinking.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of a preferred embodiment of the present invention;

FIG. 2 shows a top view of the apparatus of FIG. 1, but with a portion of the lid cutaway to show the interior thereof;

FIG. 3 is a cross-sectional view taken along line 3—3 FIG. 2;

FIG. 4 is an alternate embodiment of the present invention;

FIG. 5 is a cross-sectional view taken along line 5—5 FIG. 4; and

FIG. 6 is a partial cross-sectional view of another alternate embodiment of the present invention.

BEST MODE FOR CARRYING OUT THE INVENTION

Referring now to the drawings wherein like reference numerals designate identical or corresponding parts throughout the several views, FIG. 1 shows an animal watering apparatus (10) constructed in accordance with the present invention. The animal watering apparatus (10) has a base (11) which is sealed to the ground (12). A housing (13) is attached to the base (11) by a pair of brackets (15) and fasteners (16).

The housing (13) has a container (17) disposed therein for holding a supply of water (18). A pipe (19) extends down into the ground (12) through a tile (20) or the like and through an opening (21) in the base member (11). This water pipe (19) is pressurized and leads to a valve (22) which is operated in a conventional manner by means of a float assembly (23).

An optional electrical heater element (24) is disposed between the housing (13) and the container forming the reservoir for water (18), and the entire space between such housing (13) and container (17) is filled with insulation (25). A lid (26) is provided for sealing off the top of the reservoir or container (17) and this lid (26) is filled with insulation (27).

On one side of the housing (13) is disposed a cup-shaped member (28) having a slightly dish-shaped lower portion (29) disposed therein. An opening (30) leads from the cup-shaped member (28) to a tube (31). This tube (31) is sealingly disposed about a channel formed by the opening (30). The tube (31) extends downwardly towards the bottom of the reservoir formed by container (17).

In operation, there would typically be a slight pool of water (32) disposed within the dish-shaped portion of the cup-shaped member (28). This very slight amount of water (32) will attract animals to drink. Once an animal starts sucking on this little pool of water (32), its mouth will also be against the opening (30) and this sucking action will draw water up the tube (31) and through the opening (30) and into the animal's mouth from the water (18) in the reservoir (17). Then, as the level of water (18) in the reservoir (17) goes down, the float assembly (23) will also move down and, as is well-known in the art, will open the valve (22) to again fill the reservoir to a desired level as shown in FIG. 3. It is noted that the small opening (30) leading to the reservoir of water (18) is not so large that it will let enough cold air into the reservoir to cause the water (18) to freeze and yet, because of the design thereof, will always remain open and not freeze shut.

The provision of the optional electrical heating element (24) and its placement just under the pool of water (32) below the dish-shaped section (29) keeps the water in the pool (32) open. This may be especially important while the animals are learning to drink from this device, but may not be necessary after the animals have learned how to suck water through the hole (30). It is also noted that dirt and other contaminants will not pass from the cup-shaped member (28) into the water (18) in the reservoir formed by container (17), but instead will settle into the cup-shaped bowl (28) and will tend to be pushed out therefrom when animals are drinking from the cup-shaped member (28). Consequently, the preferred embodiment shown in FIGS. 1-3 does indeed accomplish the aforementioned objects, and in particular isolates the water (18) in the reservoir of container (17) from outside ambient air and also from dirt or other contaminants.

Referring now to FIGS. 4 and 5 and another embodiment of the invention, it is noted that the embodiment (40) shown in FIG. 4 operates just like the embodiment of FIGS. 1-3, except that no separate heating source is provided. Instead of having an electrical resistance heater such as the heater (24) shown in FIG. 3, the embodiment (40) shown in FIGS. 4 and 5 utilizes a tile or other large pipe (41) which extends down into the earth (12) to a place below the frostline so that warm temperatures from the earth will naturally rise upwardly through the tile (41) and through the base (11) and up into still another tube (42), into a space (43) between the lid (26) and the top of the water (18) disposed in container (47). The housing (44) has insulation (45) disposed therein. The cup-shaped member (28) is substantially the same as in the other embodiment (10) and has an opening (30) disposed therein and a dish-shaped portion (29) for permitting a small pool of water to form. A tube (51) leads from the bottom of the container (47) of water (18) and, of course, the operation of the device is, as far as how an animal drinks therefrom, precisely as described above with respect to the embodiment (10). The embodiment (40) of FIGS. 4 and 5 requires no outside heating source and is therefore extremely energy efficient.

FIG. 6 shows another embodiment 50 of the invention which can be identical in other ways to the embodiment 40 of FIGS. 4 and 5, but instead of having a dish-shaped section like 29 of the FIG. 5 embodiment, a dish-shaped portion 59 is utilized for forming a pool of water 32 inside of the housing from an opening 60 in a projection 62 which extends outwardly from the main housing of embodiment 50. Since the pool 32 is inside of the housing, it is less likely to freeze than in the embodiments 10 and 40 shown in FIGS. 1-5.

The operation of the FIG. 6 embodiment 50 is substantially the same as the operation described above with respect to embodiments 10 and 40. When an animal desires to drink, it is drawn to the waterer 6 because of pool 32. When the animal places its mouth over the projection and commences to suck the pool of water 32 out through opening 60, the water 18 is drawn up through the tube 51 and into the animal's mouth.

Obviously, many modifications and variations of the present invention are possible in light of the above teachings. It is therefore to be understood that, within the scope of the appended claims, the invention may be practiced otherwise than as specifically described.

We claim:

1. An apparatus for watering animals comprising:
   a housing;
   means for providing a reservoir of water within said housing;
   means for receiving the mouth of an animal, said mouth receiving means having an opening therein;
   draw tube means including a continuously open passageway extending from said opening and downwardly into a lower portion of said reservoir for permitting an animal having its mouth on such mouth receiving means to suck water from said reservoir, through said draw tube means and said opening into its mouth, whereby the water in the reservoir will constantly be available for drinking but will be isolated from outside ambient temperatures and dirt; and
   means connected to a water source for automatically maintaining a predetermined amount and level of water in said reservoir, said level being below said opening except when an animal is drinking therefrom, and said water source being located exteriorly of said housing.

2. The apparatus of claim 1 wherein said mouth receiving means comprises a projection on the outside of said housing and cup shaped means disposed in said draw tube means adjacent said opening for forming a pool of water adjacent said opening for attracting thirsty animals to said opening.

3. The apparatus of claim 2 wherein said draw tube means is contructed of a highly heat conductive material whereby the heat from said reservoir will tend to keep ice from forming in said opening in the cup shaped means.

4. The apparatus of claim 2 including means for maintaining the level of the pool of water in said cup shaped means below the top of said opening.

5. The apparatus of claim 4 wherein said opening is horizontally disposed in said cup shaped means so that an animal can form a seal with its mouth around said opening for allowing such animal to suck water up through said draw tube means.

6. The apparatus of claim 1 wherein said mouth receiving means includes a cup shaped means on the exterior of said housing for receiving the mouth of an animal to be watered, said opening being disposed in said cup shaped means.

7. The apparatus of claim 6 wherein said reservoir extends directly in juxtaposition below said cup shaped means whereby the warmer temperature in said reservoir will tend to prevent water from freezing in said cup shaped means.

8. The apparatus of claim 1 further comprising:
means for sealing said housing to the ground; and
means extending from below the frost line in the ground to a place above the level of water in said reservoir for preventing the water in the reservoir from freezing.

9. The apparatus of claim 1 including means for maintaining a predetermined level of water in said reservoir.

10. The apparatus of claim 1 including electric heating means disposed directly under and in juxtaposition with said cup shaped means for tending to prevent water from freezing in said cup shaped means.

11. The apparatus of claim 1 including means for maintaining the level of water in said reservoir below the level of said opening.

12. The apparatus of claim 11 wherein said passageway extends from said opening to the bottom of said reservoir.

13. The apparatus of claim 1 wherein the level of water in said draw tube means passageway is at the same level as the water in said reservoir except when an animal is drinking therefrom.

14. An apparatus for watering animals comprising:
a housing:
means for providing a reservoir of water within said housing;
means for receiving the mouth of an animal, said mouth receiving means having an opening therein;
draw tube means extending from said opening and into the water in said reservoir for permitting an animal having its mouth on such mouth receiving means to suck water from said reservoir, through said draw tube and said opening into its mouth, whereby the water in the reservoir will constantly be available for drinking but will be isolated from outside ambient temperatures and dirt;
means for sealing said housing to the ground; and
means extending from below the frost line in the ground to a place above the level of water in said reservoir for preventing the water in the reservoir from freezing.

* * * * *